United States Patent
Long

(10) Patent No.: US 12,353,548 B2
(45) Date of Patent: Jul. 8, 2025

(54) FILE INTEGRITY MONITORING

(71) Applicant: Gordon Long, Baltimore, MD (US)

(72) Inventor: Gordon Long, Baltimore, MD (US)

(*) Notice: Subject to any disclaimer, the term of this patent is extended or adjusted under 35 U.S.C. 154(b) by 220 days.

(21) Appl. No.: 18/102,080

(22) Filed: Jan. 26, 2023

(65) Prior Publication Data

US 2023/0244786 A1 Aug. 3, 2023

Related U.S. Application Data

(60) Provisional application No. 63/304,168, filed on Jan. 28, 2022.

(51) Int. Cl.
  *G06F 21/56* (2013.01)
  *G06F 16/13* (2019.01)
  *G06F 21/64* (2013.01)

(52) U.S. Cl.
  CPC .......... *G06F 21/565* (2013.01); *G06F 16/137* (2019.01); *G06F 21/64* (2013.01); *G06F 2221/034* (2013.01)

(58) Field of Classification Search
  None
  See application file for complete search history.

(56) References Cited

U.S. PATENT DOCUMENTS

| | | | | |
|---|---|---|---|---|
| 9,275,401 | B2* | 3/2016 | Ghaskadvi | G06Q 30/0277 |
| 2014/0129830 | A1* | 5/2014 | Raudaschl | G06F 21/6218 |
| | | | | 713/165 |
| 2014/0259166 | A1* | 9/2014 | Ghaskadvi | G06Q 30/0273 |
| | | | | 726/23 |
| 2019/0188184 | A1* | 6/2019 | Chittaro | G06F 16/152 |

* cited by examiner

*Primary Examiner* — Shirley X Zhang
(74) *Attorney, Agent, or Firm* — Fox Rothschild LLP

(57) ABSTRACT

A method, system, server, and software application provide verification of file integrity. Embodiments include determining for a byte array representing a file, whether a size of the file is larger than a threshold size value. A first predetermined section of the byte array, a second predetermined, and a third random section of the byte array is selected. A first hashing of the file is performed. A first hash value is generated of the first and second predetermined sections of the byte array and the third random section of the byte array. A second hashing of the file is performed to determine whether a second hash value that matches the first hash value. A determination is made that the file has been tampered with in the event the second hash value does not match first hash value.

20 Claims, 7 Drawing Sheets

FILE INTEGRITY MONITORING

CROSS-REFERENCE TO RELATED APPLICATIONS

This application claims benefit under 35 U.S.C. § 119(e) of U.S. Provisional Patent Application No. 63/304,168, filed Jan. 28, 2022, which is hereby incorporated by reference herein in its entirety.

TECHNICAL FIELD

The present disclosure is directed to electronic file security, and more particularly, to file integrity monitoring.

BACKGROUND OF THE DISCLOSURE

File Integrity Monitoring (FIM) is a technique used to ensure file integrity via inspecting electronic files for changes. It is an important detection mechanism, because attackers can modify important files to further attacks, or in the case of ransomware, modify files to prevent them from being accessible. There are different methods of validating file integrity based on properties of the monitored files, but generally, methods involve taking some sort of baseline measurement of the file and comparing the current file against that baseline to determine if changes have occurred. One popular method involves using the "hash" of a file, which is an algorithmically generated representation of all the bytes that comprise a file. This means that even the slightest change to the file will cause a change in the generated hash, allowing for differences to be detected.

Former approaches to file integrity revolve around checking for changes to files. Disadvantages in the former approaches include checking too infrequently, not being flexible in what is checked, not optimizing hashing, and not providing extra support beyond alerting about changes. Typically, when hashing is used, the entire file is hashed so that a hash value represents every byte of data in the file. As files grow larger, the computational resources involved in hashing increase.

SUMMARY OF THE INVENTION

In one aspect of the subject disclosure, a method for verifying the integrity of a file is provided. The method includes determining, for a byte array representing a file, whether a size of the file is larger than a threshold size value. In response to the file size being larger than the threshold size value, a first predetermined section of file bytes in the byte array, a second predetermined section of file bytes in the byte array, and a third random section of files bytes in the byte array are selected. A first hashing of the file is performed. The first hashing includes generating a first hash value of the first predetermined section of file bytes, the second predetermined section of file bytes, and the third random section of file bytes. A check of whether the file remains in the file system is made. In response to the file remaining in the file system, a second hashing of the file is performed. A determination of whether the second hashing generates a second hash value that matches the first hash value of the first predetermined section of file bytes, the second predetermined section of file bytes, and the third random section of file bytes is made. A determination is made that the file has been tampered, in the event the second hash value does not match first hash value.

In another aspect, a computer program product for monitoring file integrity of files in a file system is provided. The computer program product comprises one or more computer readable storage media, and program instructions collectively stored on the one or more computer readable storage media. The program instructions comprise determining, for a byte array representing a file, whether a size of the file is larger than a threshold size value. In response to the file size being larger than the threshold size value, a first predetermined section of file bytes in the byte array, a second predetermined section of file bytes in the byte array, and a third random section of files bytes in the byte array are selected. A first hashing of the file is performed. The first hashing includes generating a first hash value of the first predetermined section of file bytes, the second predetermined section of file bytes, and the third random section of file bytes. A check of whether the file remains in the file system is made. In response to the file remaining in the file system, a second hashing of the file is performed. A determination of whether the second hashing generates a second hash value that matches the first hash value of the first predetermined section of file bytes, the second predetermined section of file bytes, and the third random section of file bytes is made. A determination is made that the file has been tampered, in the event the second hash value does not match first hash value.

In yet another aspect, a system for file integrity monitoring is provided that includes, a computing device, a network connection connected to the computer processor, one or more computer readable storage media, a processor coupled to the network connection and coupled to the one or more computer readable storage media, and a file integrity monitoring software engine including a computer program product comprising program instructions collectively stored on the one or more computer readable storage media. The program instructions comprise determining, for a byte array representing a file, whether a size of the file is larger than a threshold size value. In response to the file size being larger than the threshold size value, a first predetermined section of file bytes in the byte array, a second predetermined section of file bytes in the byte array, and a third random section of files bytes in the byte array are selected. A first hashing of the file is performed. The first hashing includes generating a first hash value of the first predetermined section of file bytes, the second predetermined section of file bytes, and the third random section of file bytes. A check of whether the file remains in the file system is made. In response to the file remaining in the file system, a second hashing of the file is performed. A determination of whether the second hashing generates a second hash value that matches the first hash value of the first predetermined section of file bytes, the second predetermined section of file bytes, and the third random section of file bytes is made. A determination is made that the file has been tampered, in the event the second hash value does not match first hash value.

BRIEF DESCRIPTION OF THE DRAWINGS

Accompanying this written specification is a collection of drawings of exemplary embodiments of the present disclosure. One of ordinary skill in the art would appreciate that these are merely exemplary embodiments, and additional and alternative embodiments may exist and are still within the spirit of the disclosure as described herein.

DETAILED DESCRIPTION AND INDUSTRIAL APPLICABILITY

In general, the subject technology provides a file integrity monitoring process and system via optimized hashing for several major operating systems. Aspects of the file integrity monitoring herein provide flexibility regarding installation, flexibility in what is monitored, and flexibility in terms of actions taken in response to discovering changes and/or potential unauthorized attempts to access files in the system. Features of the subject technology provide a combination of constant automated or user defined monitoring, compatibility with various major operating systems, integrated logging into an existing architecture, and flexible detection responses for customers (logging vs hunting vs shutting down systems). In some embodiments, customers may have the ability to change the program name and installation location on systems to hide from attackers more effectively. As may be further appreciated, some embodiments may be in the form of a software product to help companies deal with a variety of cyber threats, particularly ransomware. Since the software embodiment works on various or different types of operating systems, it can be deployed in a large variety of environments and on a large variety of endpoints. The software embodiment will also help companies meet cybersecurity compliance requirements.

Embodiments disclosed herein have industrial applicability to cyber security and electronic file encryption systems.

It should be appreciated that elements of the embodiments disclosed herein provide an improvement to computer related technology. File integrity relates to the security of files. The embodiments disclosed in the subject technology provide security features that can expose when a file has been tampered. Moreover, it should be appreciated that as files become larger, the ability of hackers and malware to insert malicious code and/or modify code somewhere within file bytes becomes easier to hide. In many cases, a hacking entity has pre-determined a general location of bytes in a file to modify. Aspects of the subject technology improve on current file integrity techniques by randomly hashing one or more sections of bytes in the file so that it is unknown where the security feature is located and thus becomes more difficult to circumvent. As will be further appreciated, features of the subject technology perform file integrity checks regardless of the file size and may be particularly helpful when file sizes become larger. The verification process remains constant regardless of the file size, which helps save processing time and computational resources as files become larger in a system.

Example Methodologies

Figure 1:
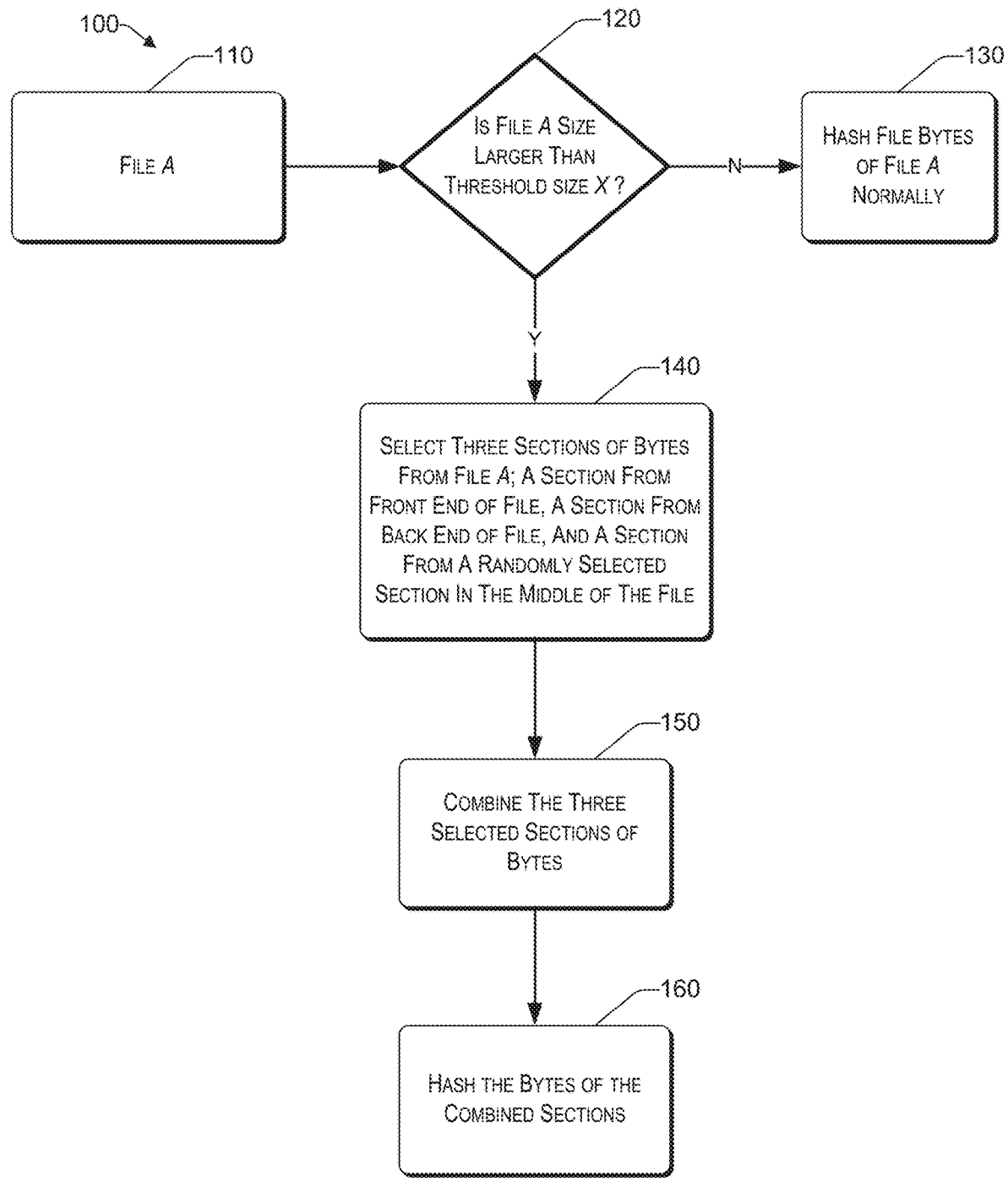
FIG. 1 is a flowchart of a process for verifying the integrity of a file according to an exemplary embodiment of the present disclosure.
Figure 3:
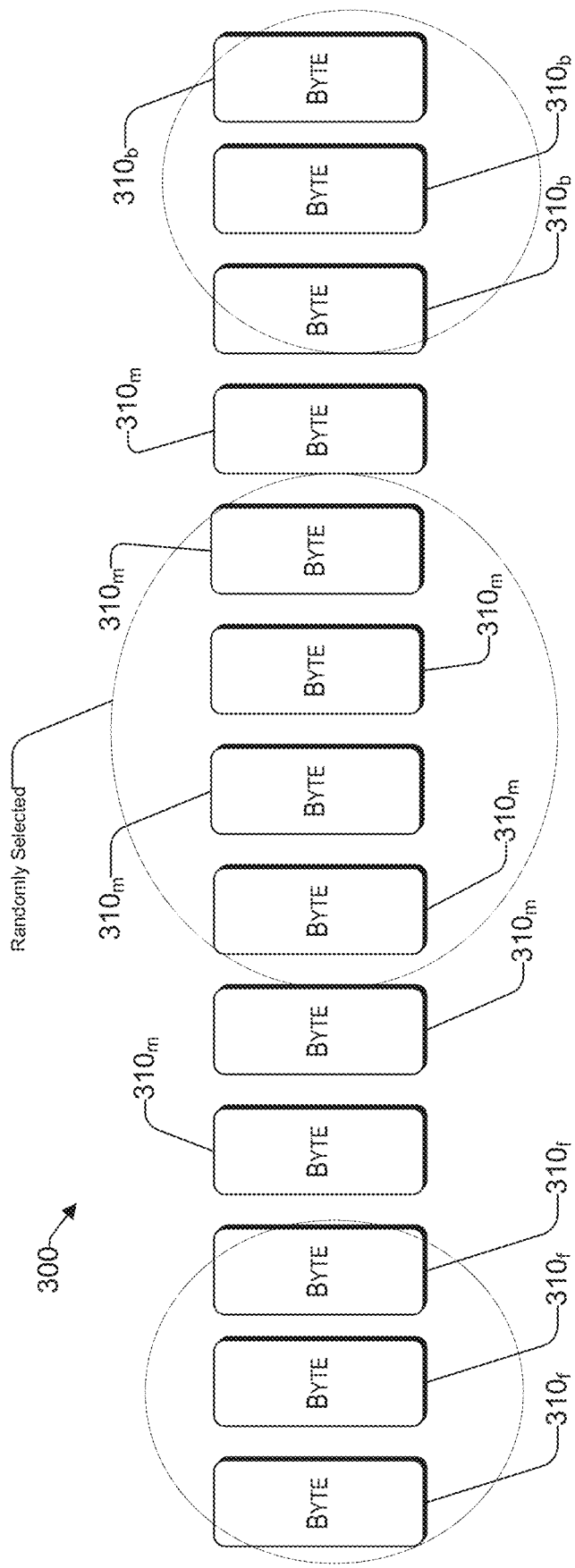
FIG. 3 is a schematic illustration of a sequence of file bytes being hashed consistent with embodiments of the present disclosure.

Referring now to FIG. 1, a process 100 for verifying the integrity of a file is shown according to an embodiment. FIG. 1 should be viewed concurrently with FIG. 3, which provides an illustration of some parts of the process 100. The process 100 begins with a File A 110 that has an arbitrary number of bytes. For the embodiments described the File A requires at least four bytes and is usually much larger. For sake of illustration, FIG. 3 shows a byte array 300 (generally designated as "310") that represents a file being verified for integrity. In the example provided, the byte array 300 includes thirteen bytes 310 however it should be understood that more or less bytes 310 may be present in the file. The byte array 300 may be divided into a front end section of file bytes $310_f$, a middle section of file bytes $310_m$, and a back end section of file bytes $310_b$. In some embodiments, the front end section of file bytes $310_f$ may be for example, a header depending on the file type. In some embodiments, the back end section of file bytes $310_b$ may be a footer or trailer depending on the file type. In the illustration shown, the front end section and back end section of file bytes include three bytes 310 each, however it should be understood that these sections may include more or less bytes respectively (and not necessarily the same number in each section). The middle section of file bytes includes seven bytes $310_m$, however embodiments may include more or less bytes.

Referring back to FIG. 1, the process may determine 120, whether the File A has more bytes in its file size than a threshold value X If the file size is less than or equal to threshold value X, then the process may hash 130 the file bytes under a conventional or (other) process. The process includes hashing files (using either another hash process or a hash process under the subject technology depending on file size) to record changes. The speed of hashing files becomes more important as more files are added to be monitored. The faster files can be hashed, the faster changes can be detected and alerted upon. Regardless of the operating system, the subject process performs optimizations in terms of which bytes of the files are used for hashing once files reach a certain size n. This allows hashing to be done faster, since only a certain number of random bytes will be concatenated together and hashed, as opposed every byte needing to be hashed for large files.

As may be appreciated, the determination performed here may be helpful in customizing which files should be verified using aspects of the subject technology so that computing resources are optimized. For example, an administrative user (or in some embodiments, a software engine) may evaluate the savings costs associated with verifying the integrity of files of different file sizes using the subject hashing processes. Based on the savings costs, the threshold value X may be set so that unnecessary resources are used in applying the hashing of the subject disclosure to files that are too small.

In the event, the file size of File A is above the threshold value X, a file integrity engine (described in more detail below with respect to a system embodiment) may hash the file A under the subject hashing process. In one embodiment, the hashing process selects 140 a first predetermined section of the byte array, a second predetermined section of the byte array, and a third random section of the byte array. The first and second predetermined sections of file bytes selected may be for example (referring back to FIG. 3), from the front end section of bytes $310_f$ and from the back end section of bytes $310_b$ (as represented by encircling). As shown, all of the bytes in the respective front end section of bytes $310_f$ and the back end section of bytes $310_b$ are selected, however it will be understood that less than all of the front end section of bytes and/or less than all of the back end section of bytes. Some embodiments may select a different number of bytes for the front end section of bytes $310_f$ than for the back end section of bytes $310_b$. In some embodiments, the predetermined sections may be bytes other than the front end and back end sections.

The random section of bytes selected may be selected from the middle section of bytes $310_m$. The number of bytes selected from the middle section may be arbitrary, random, or predetermined. In some embodiments, the bytes selected from the middle section may be sequential or may be non-sequential. The bytes selected from the middle section may be the same bytes evaluated during a subsequent hashing and verification step. When different files are being verified for integrity, the number of bytes from the middle section and/or group of bytes from the middle section selected may differ from one file to another file. For example, in FIG. 3, the middle section of bytes includes seven bytes $310_m$ in a file that includes thirteen overall bytes. In the example shown, bytes 6-9 of the overall thirteen bytes are selected (as represented by encircling). Bytes 6-9 are sequential and less than the total number of bytes available in the middle section (which in the example includes seven middle section bytes $310_m$).

The file integrity engine may combine 150 the three selected sections of bytes into a placeholder array. The file integrity engine hashes 160 the bytes of the combined sections to generate a hash value for the File A. As will be described further below, the hash value for file A will be compared to hash values generated in a future integrity verification check using the same selected sections of the file A to check whether file A has been tampered with.

Figure 2A:
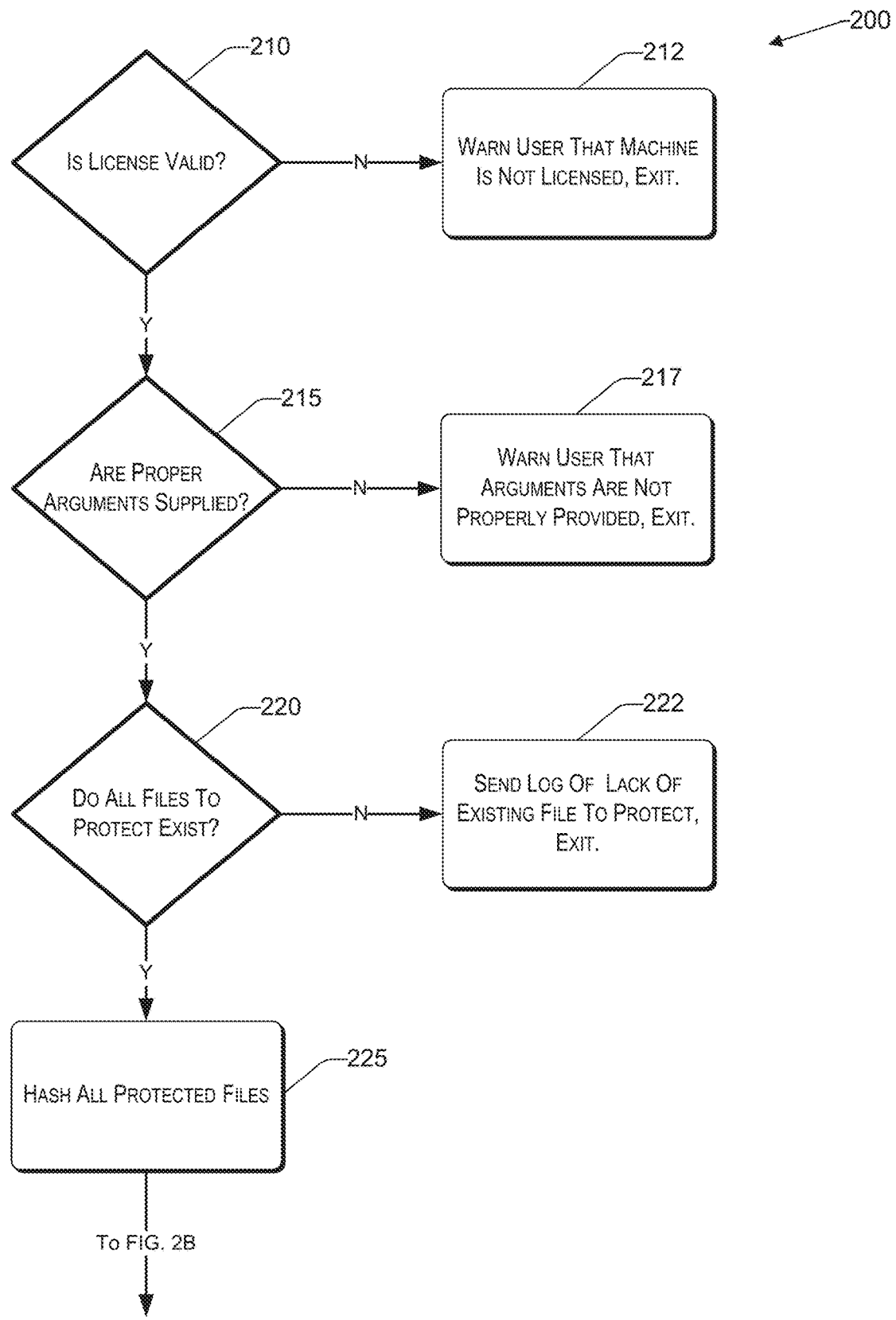
FIGS. 2A-2B are a flowchart of a process for determining the integrity of files in a filesystem according to an exemplary embodiment of the present disclosure.
Figure 2B:
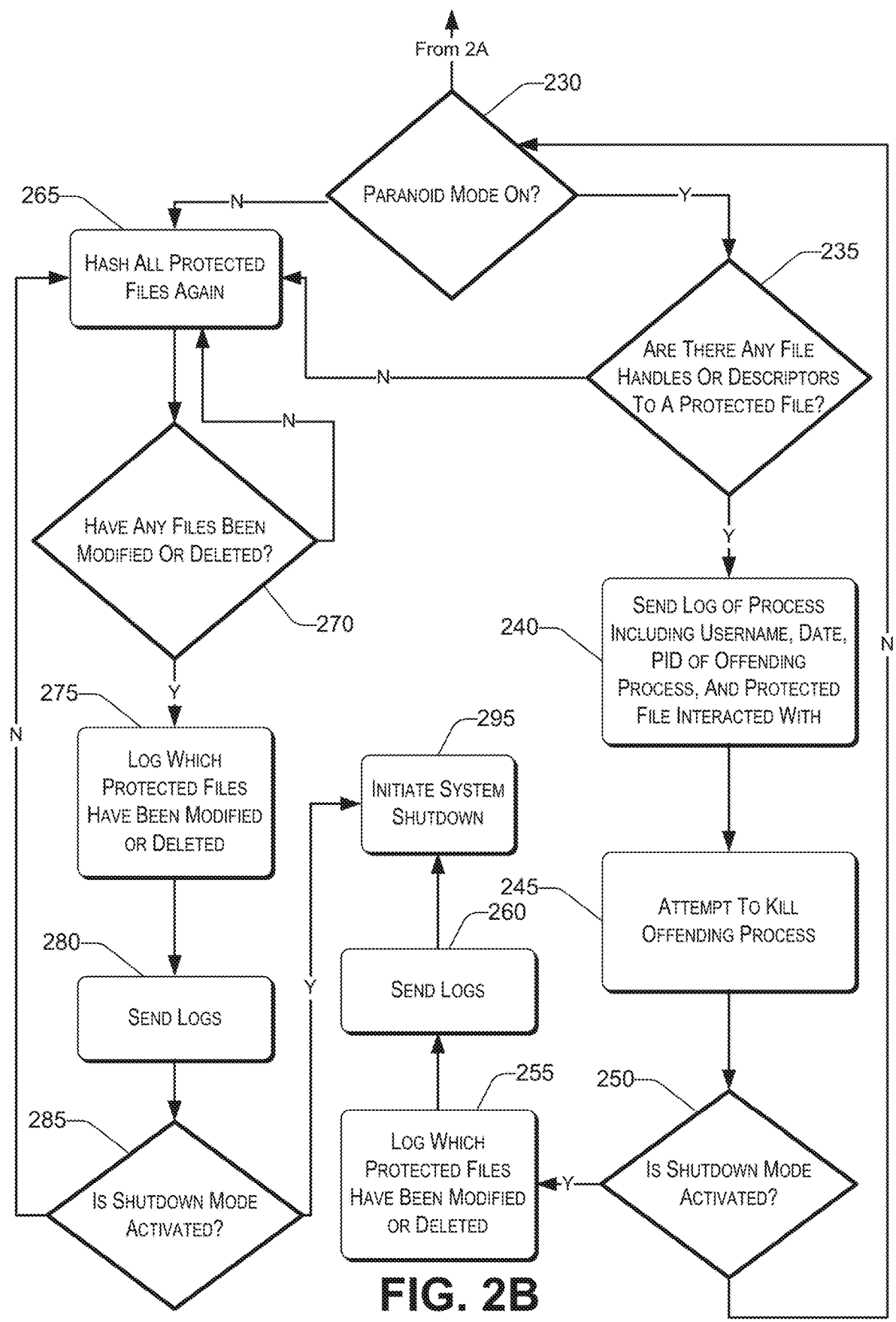

Referring now to FIGS. 2A and 2B, a process 200 for determining the integrity of files in a filesystem is shown according to an embodiment. The file integrity engine may determine in general actions to take and/or what objects to monitor. The file integrity engine may determine 210 whether the machine storing the filesystem has a valid license for integrity monitoring. If not, the engine may issue 212 a warning that the machine lacks a license, and the process may terminate. For validly licensed machines, the engine may determine 215 whether proper arguments are supplied. Proper arguments may include user input that identify the location of the files to monitor, whether to be "armed" or initiate a shutdown upon finding bad behavior in a file, and where to send local/remote logs. When proper arguments are not supplied, the engine may issue 217 a warning and the process may terminate. The engine may determine 220 whether all objects being monitored or protected exist in the file system. When files are missing, the engine may send 222 a log showing what files are missing. In some embodiments, the lack of files may terminate the process prior to providing further integrity verification measures.

For objects that exist in the system being monitored, hashes may be calculated 225 for each object. In some embodiments, optimization may occur for one or more objects of sufficient file size. In general, the process stores hashes of objects in a table.

Periodically, the engine checks if objects to be monitored still exist on the system. For objects that still exist, hashes may be calculated. However, for objects that have gone missing, the process warns the user of suspicious deletion(s), logs activity, and performs a pre-determined action. Pre-determined actions may include for example, logging the occurrence of an offending process; hunting down the offending process, attempting to kill the offending process, and logging the identification of the offending process along with information about who launched the offending process, (for example, date/time it was launched, process ID (PID), etc.); and/or shutting down the system once suspicious activity is noted. The nonexistent object(s) is removed from table entries to prevent duplicate logging. Some embodiments may include cycling back, after entries are removed.

The process may check if newly calculated object hashes match table entries for object hashes. If the hashes match, the process considers the objects to be unaltered. If hashes do not match entries, the process may warn the user of a suspicious change(s), logs activity, and performs a pre-determined action. The identified changed object may be replaced in the table entry to prevent duplicate logging. This will also allow logging any additional changes found.

For example, when files in the filesystem are hashed, the engine may monitor 230 (labeled as "Paranoid Mode" in one embodiment) the filesystem for accessed files (which may include for example, files that have been exfiltrated, modified, tampered, or in some instances deleted). In the step of monitoring 230, the file integrity engine may periodically hash files again. The hash values generated for files performed after the first hashing maybe compared to hash values performed during a second hashing (and subsequent hashing thereafter) of the files in the filesystem. The file integrity engine may determine whether the second hashing generates a second hash value that matches the first hash value of the first predetermined section of the byte array, the second predetermined section of the byte array, and the third random section of the byte array (for example, by comparing hash values for the combined first, second, and third sections of bytes stored in tables). When the hash values match, the process may periodically automatically loop to verify the integrity of files. When the hash values for a file do not match, the process may invoke one of two modes for verifying integrity.

In one mode, the file integrity engine may determine whether any of the tampered files include open file handles or descriptors. If not, the file integrity engine may hash all the protected files again. When open handles or descriptors are found, the file integrity engine may log 240 the file that was interacted with another process (for example, malware or some other unauthorized process). The log may include the filename of the tampered file, a user name, a date, a PID, and name of the offending process. The log may be created locally and may be sent to a customer specified remote address (for example, a webpage, web server, etc.). This is to help support integration with 3rd party logging tools such as Splunk™, ELK™, etc. that the customer may use. The file integrity engine may attempt to terminate 245 the offending process found on the tampered file. The file integrity engine may determine 250 whether a system shutdown may be invoked. In some embodiments, a system shutdown event may be triggered based on a customer defined setting that invokes the shutdown if an offending process is found or a file is modified or deleted. If a shutdown process is activated, the file integrity engine may log 255 which protected files have been modified or deleted since the previous round of hashing was performed. The logs may be sent 260 to the customer similar to the step described in block 240. The file integrity engine may proceed to shutdown 295 the file system (or platform on which the file system is housed).

In another mode, the file integrity engine may directly hash 265 all the protected files again. The file integrity engine may determine 270 whether any of the protected files have been modified or deleted since the previous round of hashing was performed. The file integrity engine may log 275 which protected files have been modified or deleted. The log may be sent 280 to the customer similar to the step described in block 240. The file integrity engine may determine 285 whether a system shutdown may be invoked. The file integrity engine may proceed to shutdown 295 the file system if invoked or may loop back to hashing 265 all the protected files again. In some embodiments, the process may continuously loop in the background. The process may exit if the armed option is selected true (and the system is shutdown) or if the list of files being iterated through has been deleted.

Agnostic File Size Optimization

As an illustrative example of how the example methodologies described above may be agnostic to the file size and may be more efficient for larger file sizes, one may first consider a File A size n−1 bytes. All bytes of File A will be read, and then all bytes of File A will be used to calculate for example, a SHA1 hash. It should be understood that the SHA 1 algorithm is only an example and that other cryptography algorithms may be used. A File B may be size n bytes. Only certain chunks of bytes of File B will be read, for example, the beginning bytes, ending bytes, and a random chunk of bytes of equal size somewhere in the middle. These chunks will be of size z. By definition, $z*3 \leq n-1$ for the optimization to be applied, since three chunks must be less than the total byte count of the file for the optimization to make sense. This optimization has the added bonus of preventing extremely large files from crashing the program, as it prevents all of these bytes from being read into memory and overloading it. This saves time for hashing operations and becomes significantly more efficient the larger monitored files become.

So, the max amount of time it takes for a hash to be computed can be demonstrated in the following examples:

File A: SHA1 (n−1)=some hash. Since the file size is so small, optimization using the methodologies above may not be needed.

File B: SHA1(z*3)=some hash. This calculation is at MOST as slow as size(n−1).

The same applies for significantly larger files. For example, for a File C of size 2n. The max amount of time to compute a hash for File C is also SHA1(z*3)=some hash. This calculation is at MOST as slow as size(n−1).

This allows the subject process to detect changes more quickly than traditional file integrity management (FIM) systems and reduces system overhead when monitoring many files.

Frequency of Monitoring and Monitoring Options

Many FIM products monitor file systems over the course of hours. For example, the open source tool OSSEC™ runs by default every six hours to check file integrity. The subject technology may run continuously in the background, so that the time to detection of a file change is counted in seconds, as opposed to hours. This can be modified if desired to run less continuously, to reduce CPU load.

For Mac® and Linux®, users can define multiple files to monitor, a directory (folder) to monitor, or multiple files in different file locations to monitor. Currently the Windows® version only allows for the monitoring of files, although these files can also be in different file locations. A future planned feature will allow users on Windows to also guard entire directories if they so desire.

Additional Features—Reaction Capabilities, and Exfiltration Defenses

The subject technology is designed to allow users to define response actions taken when a file change is detected. In certain modes, a file change is not even necessary to trigger a reaction, as opposed to attempting to access/perform an action on a monitored file. This is a differentiation from many FIM tools. The subject technology may monitor file handles and file descriptors for file access to a protected file as well as changes to files. These additional features allow for detection of actions such as data exfiltration, in which an attacker will attempt to download files to their own controlled servers for later use/extortion/sale.

The subject technology may log suspected behavior and attempts to integrate into existing security architecture to transmit its logs (at minimum, logs will be created on the local machine). This log information includes user, PID, date/time, and other process information.

The subject technology allows users to specify whether they want to take more aggressive actions; these include attempting to kill the process causing the suspect behavior or shutting down the endpoint which the subject technology is protecting in order to prevent further malicious actions from being taken. The log information will be created/transmitted before the endpoint is shut down. If tasked with shutting down the endpoint, in addition to the regular log information, the subject technology may also provide a running list of modules, processes, users, PIDs just before shutdown. This can aid with forensic analysis later and potentially identify malicious processes.

Additional Features—Logging Integration

In some embodiments, the subject technology may integrate with existing security tools rather than use an individualized dashboard, unlike many competitors. If a company is using Splunk®, ELK®, or other major logging solutions, the subject technology may push logs directly to these third party solutions. The subject technology may also create logs on the local endpoint. Depending on customer requests, logging capabilities may be modified as needed to suit the environment. Logging may use all plaintext format, although json format and other formats may also be utilized to work with existing security architecture if necessary. The logging format is highly flexible.

FIM Implications on Compliance

FIM is needed for many regulatory compliance standards in industries such as:

PCI-DSS—Payment Card Industry Data Security Standard;

HIPAA—Health Insurance Portability and Accountability Act;

SOX—Sarbanes-Oxley Act;

FISMA—Federal Information Security Management Act;

NERC CIP—North American Electric Reliability Corporation critical infrastructure protection; and NIST—National Institute of Standards and Technology.

As a FIM tool, embodiments of the subject technology help companies fulfill these requirements.

Figure 4:
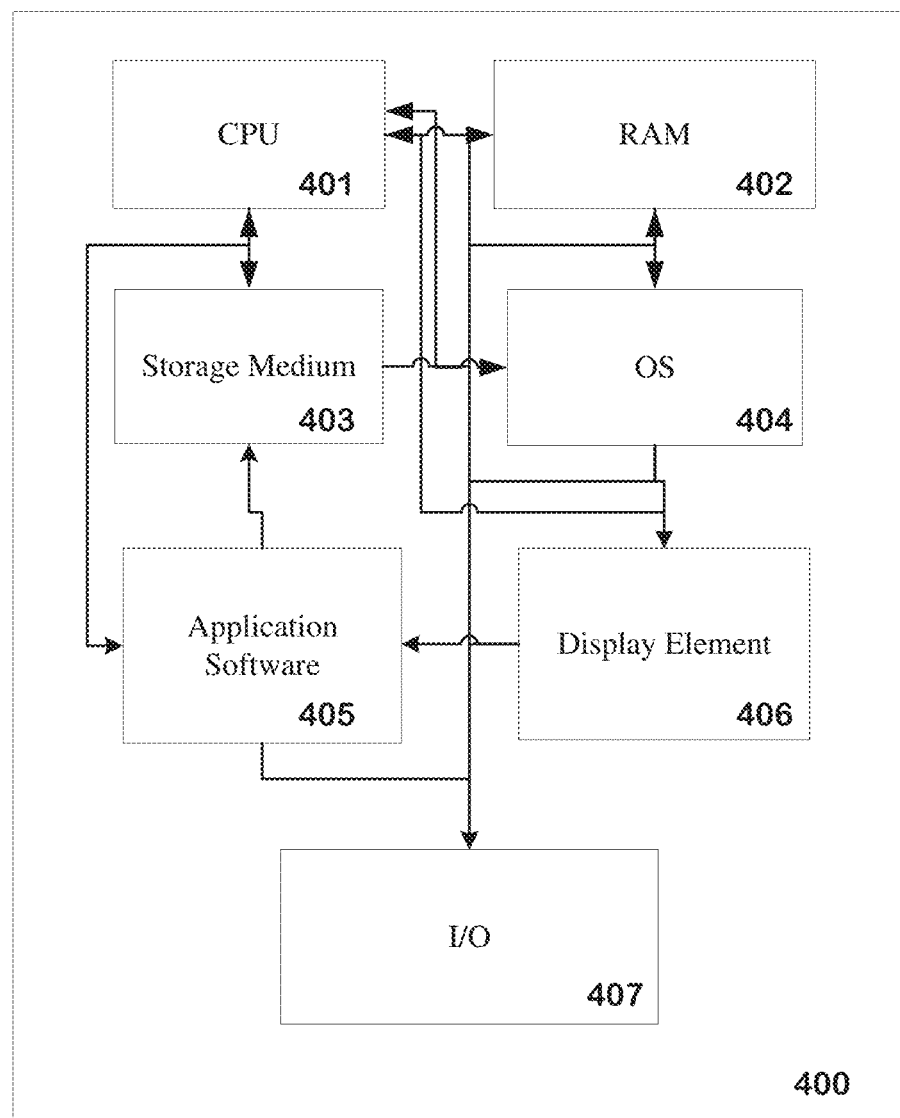
FIG. 4 is a schematic illustration of an exemplary computing device, in accordance with at least some exemplary embodiments of the present disclosure.

An illustrative representation of a computing device appropriate for use with embodiments of the system of the present disclosure is shown in FIG. 4. The computing device 400 can generally be comprised of a Central Processing Unit (CPU, 401), optional further processing units including a graphics processing unit (GPU), a Random Access Memory (RAM, 402), a mother board 403, or alternatively/additionally a storage medium (e.g., hard disk drive, solid state drive, flash memory, cloud storage), an operating system (OS, 404), one or more application software 405, a display element 406, and one or more input/output devices/means 407, including one or more communication interfaces (e.g., RS232, Ethernet, Wifi, Bluetooth, USB). Useful examples include, but are not limited to, personal computers, smart phones, laptops, mobile computing devices, tablet PCs, and servers. Multiple computing devices can be operably linked to form a computer network in a manner as to distribute and share one or more resources, such as clustered computing devices and server banks/farms. In some embodiments, the CPU 401 performs the operations described above with respect to FIGS. 1, 2A, 2B, and 3.

Various examples of such general-purpose multi-unit computer networks suitable for embodiments of the disclosure, their typical configuration and many standardized communication links are well known to one skilled in the art.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 5:
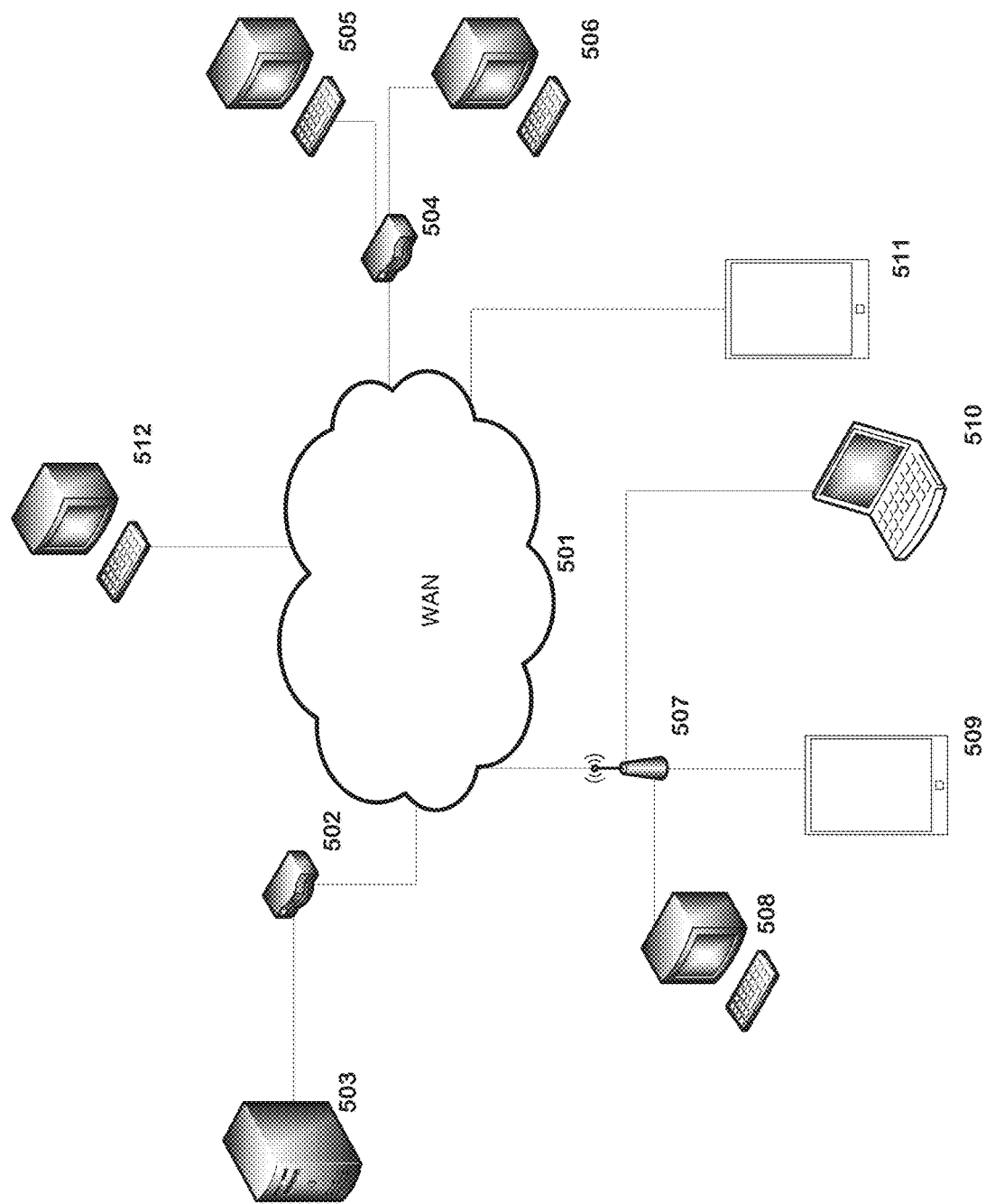
FIG. 5 is a schematic illustration of an exemplary network, in accordance with at least some exemplary embodiments of the present disclosure.

Referring to FIG. 5, a schematic overview of a system in accordance with an embodiment of the present disclosure is shown. The system is comprised of one or more application servers 503 for electronically storing information used by the system. The application server 503 may in some embodiments, be a device storing files that are being monitored for file integrity verification according to aspects of the subject technology as discussed above. Or in some embodiments, the server 503 may be a host computing device operating the subject technology remotely from computing devices 505 or 506 that have files being monitored for suspicious activity. Applications in the server 503 may retrieve and manipulate information in storage devices and exchange information through a WAN 501 (e.g., the Internet). Applications in server 503 may also be used to manipulate information stored remotely and process and analyze data stored remotely across a WAN 501 (e.g., the Internet). In some embodiments, a computing device 512 stores software in the form of a file integrity engine. The file integrity engine may include software instructions that monitor files in a filesystem stored in the application server 503 or stored on local computing devices 505, 506, 508, 509, 510, and 511.

The exchange of information through the WAN 501 or other network may occur through one or more high speed connections. In some cases, high speed connections may be over-the-air (OTA), passed through networked systems, directly connected to one or more WANs 501 or directed through one or more routers 502. Router(s) 502 are completely optional and other embodiments in accordance with the present disclosure may or may not utilize one or more routers 502. One of ordinary skill in the art would appreciate that there are numerous ways server 503 may connect to WAN 501 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 503 via WAN 501 or other network in numerous ways. For instance, a component or module may connect to the system i) through a computing device 512 directly connected to the WAN 501, ii) through a computing device 505, 506 connected to the WAN 501 through a routing device 504, iii) through a computing device 508, 509, 510 connected to a wireless access point 507 or iv) through a computing device 511 via a wireless connection (e.g., CDMA, GMS, 3G, 4G, 5G) to the WAN 501. One of ordinary skill in the art will appreciate that there are numerous ways that a component or module may connect to server 503 via WAN 501 or other network, and embodiments of the present disclosure are contemplated for use with any method for connecting to server 503 via WAN 501 or other network. Furthermore, server 503 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Figure 6:
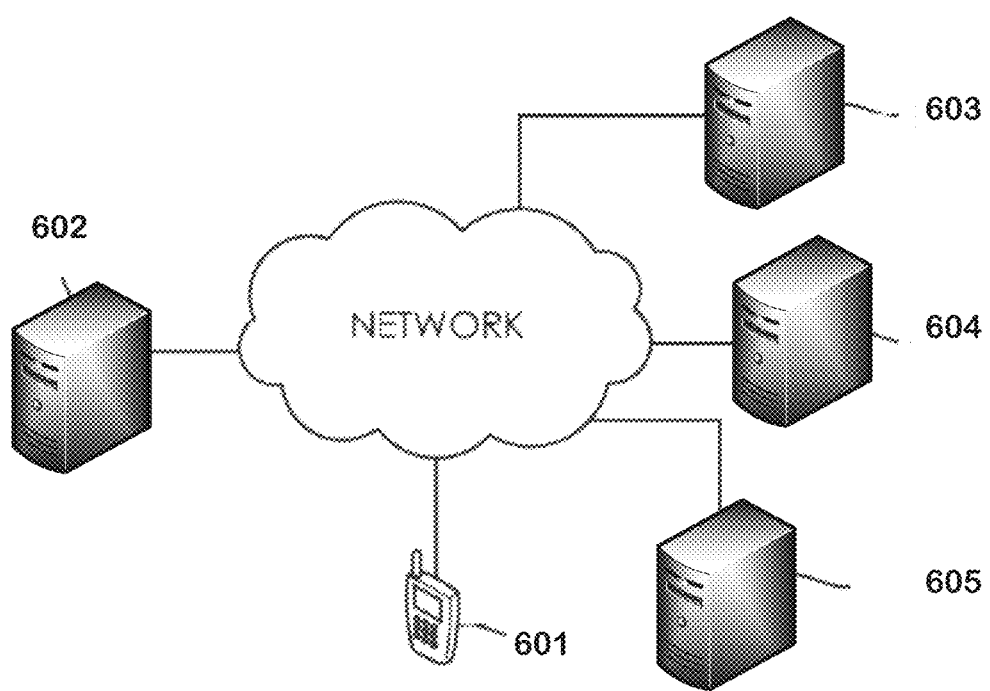
FIG. 6 is a schematic illustration of an exemplary network, in accordance with at least some exemplary embodiments of the present disclosure.

Turning now to FIG. 6, a continued schematic overview of a cloud-based system in accordance with an embodiment of the present invention is shown. In FIG. 6, the cloud-based system is shown as it may interact with users and other third party networks or APIs (e.g., APIs associated with the exemplary disclosed E-Ink displays). For instance, a user of a mobile device 601 may be able to connect to application server 602. Application server 602 may be able to enhance or otherwise provide additional services to the user by requesting and receiving information from one or more of an external content provider API/website or other third party system 603, a constituent data service 604, one or more additional data services 605 or any combination thereof. Additionally, application server 602 may be able to enhance or otherwise provide additional services to an external content provider API/website or other third party system 603, a constituent data service 604, one or more additional data services 605 by providing information to those entities that is stored on a database that is connected to the application server 602. One of ordinary skill in the art would appreciate how accessing one or more third-party systems could augment the ability of the system described herein, and embodiments of the present invention are contemplated for use with any third-party system.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

In at least some exemplary embodiments, the exemplary disclosed system may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. For example, machine learning or artificial intelligence modules may be configured to automatically identify optimal file size thresholds for invoking hashing according to the above methodologies, automatically identify modified or deleted files in the filesystem, and determine scenarios for system shutdown to protect the filesystem(s). The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

While multiple embodiments are disclosed, still other embodiments of the present disclosure will become apparent to those skilled in the art from this detailed description. There may be aspects of this disclosure that may be practiced without the implementation of some features as they are described. It should be understood that some details have not been described in detail in order to not unnecessarily obscure the focus of the disclosure. The disclosure is capable of myriad modifications in various obvious aspects, all without departing from the spirit and scope of the present disclosure. Accordingly, the drawings and descriptions are to be regarded as illustrative rather than restrictive in nature.

What is claimed is:

1. A method for monitoring file integrity of files in a file system, comprising:
  for a byte array representing a file, determining whether a size of the file is larger than a threshold size value;
  in response to the file size being larger than the threshold size value, selecting a first predetermined section of file bytes in the byte array, a second predetermined section of file bytes in the byte array, and a third random section of files bytes in the byte array;

performing a first hashing of the file, wherein the first hashing includes generating a first hash value of the first predetermined section of file bytes, the second predetermined section of file bytes, and the third random section of file bytes, wherein the location of the third random section of file bytes is recorded;

checking whether the file remains in the file system;

in response to the file remaining in the file system, performing a second hashing of the file, wherein the second hashing includes generating a second hash value of the first predetermined section of file bytes and the second predetermined section of file bytes, and the second hashing utilizes the third random section of file bytes recorded from the first hashing;

determining whether the second hashing generates a second hash value that matches the first hash value of the first predetermined section of file bytes, the second predetermined section of file bytes, and the third random section of file bytes; and automatically determining that the file has been tampered, in the event the second hash value does not match the first hash value, monitoring for one or more offending processes attached to the tampered file, logging the occurrence of one or more offending processes, and performing a user pre-determined action in response to one or more offending processes.

2. The method of claim 1, wherein:

the first predetermined section of file bytes is a first sequence of bytes on a front end of the byte array;

the second predetermined section of file bytes is a second sequence of bytes on a back end of the byte array; and the third random section of file bytes is a third sequence of bytes located in a middle section of the byte array.

3. The method of claim 2, wherein the third random section of file bytes is located anywhere between the first sequence of bytes and the second sequence of bytes.

4. The method of claim 1, wherein the third random section of the file bytes hashed in the first hashing is a same sequence of bytes hashed in the performance of the second hashing of the file.

5. The method of claim 1, further comprising combining the first predetermined section of file bytes, the second predetermined section of file bytes, and the third random section of file bytes into a placeholder array and generating the first hash value from the placeholder array.

6. The method of claim 1, wherein monitoring for one or more offending processes occurs continuously and further comprising logging an identification of one or more offending processes along with offending process characteristics including information about who launched one or more offending processes, the time when one or more offending processes was identified, host networking information associated with one or more offending processes, and hostnames for any impacted machines or computers.

7. The method of claim 1, wherein the user pre-determined action can include hunting down one or more offending processes, attempting to kill one or more offending processes, or shutting down the file system.

8. A non-transitory computer readable medium having program instructions stored thereon for monitoring file integrity of files in a file system which, when executed by a processor, causes the processor to carry out the steps of:

for a byte array representing a file, determining whether a size of the file is larger than a threshold size value;

in response to the file size being larger than the threshold size value, selecting a first predetermined section of file bytes in the byte array, a second predetermined section of file bytes in the byte array, and a third random section of files bytes in the byte array;

performing a first hashing of the file, wherein the first hashing includes generating a first hash value of the first predetermined section of file bytes, the second predetermined section of file bytes, and the third random section of file bytes, wherein the location of the third random section of file bytes is recorded;

checking whether the file remains in the file system;

in response to the file remaining in the file system, performing a second hashing of the file, wherein the second hashing includes generating a second hash value of the first predetermined section of file bytes and the second predetermined section of file bytes, and the second hashing utilizes the third random section of file bytes recorded from the first hashing;

determining whether the second hashing generates a second hash value that matches the first hash value of the first predetermined section of file bytes, the second predetermined section of file bytes, and the third random section of file bytes; and automatically determining that the file has been tampered, in the event the second hash value does not match the first hash value, monitoring for one or more offending processes attached to the tampered file, logging the occurrence of one or more offending processes, and performing a user pre-determined action in response to one or more offending processes.

9. The non-transitory computer readable medium of claim 8, wherein:

the first predetermined section of file bytes is a first sequence of bytes on a front end of the byte array;

the second predetermined section of file bytes is a second sequence of bytes on a back end of the byte array; and the third random section of file bytes is a third sequence of bytes located in a middle section of the byte array.

10. The non-transitory computer readable medium of claim 9, wherein the third random section of file bytes is located anywhere between the first sequence of bytes and the second sequence of bytes.

11. The non-transitory computer readable medium of claim 8, wherein the third random section of file bytes hashed in the first hashing is a same sequence of bytes hashed in the performance of the second hashing of the file.

12. The non-transitory computer readable medium of claim 8, wherein the program instructions further comprise combining the first predetermined section of file bytes, the second predetermined section of file bytes, and the third random section of file bytes into a placeholder array and generating the first hash value from the placeholder array.

13. The non-transitory computer readable medium of claim 8, wherein the program instructions further comprise monitoring for one or more offending processes continuously and logging an identification of one or more offending processes along with offending process characteristics including information about who launched one or more offending processes, the time when one or more offending processes was identified, host networking information associated with one or more offending processes, and hostnames for any impacted machines or computers.

14. The non-transitory computer readable medium of claim 8, wherein the user pre-determined action can include hunting down one or more offending processes, attempting to kill one or more offending processes, or shutting down the file system.

15. A system for file integrity monitoring, comprising:
a computing device;
a network connection connected to the computing device;
one or more computer readable storage media;
a processor coupled to the network connection and coupled to the one or more computer readable storage media; and
a file integrity monitoring software engine including a computer program product comprising program instructions collectively stored on the one or more computer readable storage media, the program instructions comprising:
for a byte array representing a file, determining whether a size of the file is larger than a threshold size value;
in response to the file size being larger than the threshold size value, selecting a first predetermined section of file bytes in the byte array, a second predetermined section of file bytes in the byte array, and a third random section of files bytes in the byte array;
performing a first hashing of the file, wherein the first hashing includes generating a first hash value of the first predetermined section of file bytes, the second predetermined section of file bytes, and the third random section of file bytes, wherein the location of the third random section of file bytes is recorded;
checking whether the file remains in the file system;
in response to the file remaining in the file system, performing a second hashing of the file, wherein the second hashing includes generating a second hash value of the first predetermined section of file bytes and the second predetermined section of file bytes, and the second hashing utilizes the third random section of file bytes recorded from the first hashing;
determining whether the second hashing generates a second hash value that matches the first hash value of the first predetermined section of file bytes, the second predetermined section of file bytes, and the third random section of file bytes; and
automatically determining that the file has been tampered, in the event the second hash value does not match the first hash value, monitoring for one or more offending processes attached to the tampered file, logging the occurrence of one or more offending processes, and performing a user pre-determined action in response to one or more offending processes.

16. The system of claim 15, wherein:
the first predetermined section of file bytes is a first sequence of bytes on a front end of the byte array;
the second predetermined section of file bytes is a second sequence of bytes on a back end of the byte array; and
the third random section of file bytes is a third sequence of bytes located in a middle section of the byte array.

17. The system of claim 16, wherein the third random section of file bytes is located anywhere between the first sequence of bytes and the second sequence of bytes.

18. The system of claim 15, wherein the third random section of file bytes hashed in the first hashing is a same sequence of bytes hashed in the performance of the second hashing of the file.

19. The system of claim 5, wherein the program instructions further comprise combining the first predetermined section of file bytes, the second predetermined section of file bytes, and the third random section of file bytes into a placeholder array and generating the first hash value from the placeholder array.

20. The system of claim 15, wherein the program instructions further comprise monitoring for one or more offending processes continuously and logging an identification of one or more offending processes along with offending process characteristics including information about who launched one or more offending processes, the time when one or more offending processes was identified, host networking information associated with one or more offending processes, and hostnames for any impacted machines or computers.

* * * * *